(12) United States Patent
Gabrielson et al.

(10) Patent No.: US 9,503,351 B1
(45) Date of Patent: Nov. 22, 2016

(54) DEPLOYMENT FEEDBACK FOR SYSTEM UPDATES TO RESOURCES IN PRIVATE NETWORKS

(71) Applicant: Amazon Technologies, Inc., Reno, NV (US)

(72) Inventors: Jacob Adam Gabrielson, Seattle, WA (US); Jean-Paul Bauer, Seattle, WA (US); Michael Phillip Quinn, Seattle, WA (US); Weizhong Hua, Bellevue, WA (US); Casey Thomas Huggins, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 156 days.

(21) Appl. No.: 14/565,168

(22) Filed: Dec. 9, 2014

(51) Int. Cl.
*G06F 15/173* (2006.01)
*H04L 12/26* (2006.01)

(52) U.S. Cl.
CPC ........... *H04L 43/14* (2013.01); *H04L 43/0876* (2013.01)

(58) Field of Classification Search
CPC ............................. H04L 43/14; H04L 43/0876
USPC ........ 709/202, 203, 217, 224, 225, 229, 238
See application file for complete search history.

(56) References Cited

U.S. PATENT DOCUMENTS

| | | | |
|---|---|---|---|
| 7,243,138 B1 * | 7/2007 | Majkut | G06F 17/30415 707/999.003 |
| 7,340,520 B1 | 3/2008 | Jordan et al. | |
| 7,624,086 B2 | 11/2009 | Keith, Jr. | |
| 8,924,947 B2 | 12/2014 | Blohm et al. | |
| 2003/0188001 A1 * | 10/2003 | Eisenberg | H04L 29/06 709/229 |
| 2006/0048145 A1 | 3/2006 | Celli et al. | |
| 2006/0080659 A1 | 4/2006 | Ganji | |
| 2007/0083588 A1 | 4/2007 | Keller et al. | |
| 2011/0314154 A1 * | 12/2011 | Resch | H04L 63/06 709/225 |

\* cited by examiner

*Primary Examiner* — Michael Y Won
(74) *Attorney, Agent, or Firm* — Robert C. Kowert; Meyertons, Hood, Kivlin, Kowert & Goetzel, P.C.

(57) ABSTRACT

Deployment feedback for updates to resources implemented in a private network may be implemented. Feedback codes may be generated and included in deployments sent to a private network for deployment at resources implemented in the private network. One or more of the included feedback codes may be selected based on the performance of the deployment and provided via a feedback communication channel that is disconnected and distinct from the private network. Once received, a current status of the deployment may be determined based on the one or more feedback codes provided via the feedback communication channel.

20 Claims, 7 Drawing Sheets

FIG. 7

DEPLOYMENT FEEDBACK FOR SYSTEM UPDATES TO RESOURCES IN PRIVATE NETWORKS

BACKGROUND

Cloud-based infrastructure offers many advantages for companies, developers, or other entities that may implement new systems and technologies leveraging the accessibility, flexibility, and reliability. Many different types of services, systems, or functions may be implemented using cloud-based resources for client systems or devices. For example, cloud-based resources, such as virtual compute instances, may be used to implement a network-based service for external customers, such as an e-commerce platform. Cloud-based resources may also be used to implement a service or tool for internal customers, such as information technology (IT) service implemented as part of an internal network for a corporation. Cloud-based resources, such as virtual networks, may be used to direct or control network traffic in order to perform the various functions or tasks provided by the services or functions performed utilizing other cloud-based resources, in another example. Instead of investing resources in acquiring various hardware and software components, cloud-based resources may be procured to provide the infrastructure upon which these new systems and technologies may be built.

Cloud-based resources are often provided by a provider network, which may include many different types of network-based services that can be used to implement cloud-based infrastructure resources. Developers can request, provision, and configure various different cloud-based resources from the network-based services offered as part of the development of new systems and products. However, as infrastructure requirements become more complex, the costs and complexity to maintain cloud-based resources may increase, as the time and expertise needed to deploy updates may grow more cumbersome.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

The systems and methods described herein may implement deployment feedback for updates to resources in private networks, according to some embodiments. Private networks often implement resources, such as various network-based resources, that may perform sensitive operations and/or maintain private information. Financial services, merchants, banks, and other holders of private information may utilize resources in private networks to perform various tasks and operations, while maintaining a level of privacy for certain aspects of the operations or data. The upkeep of these resources in a private network may reply upon various deployments, such as updates, patches, upgrades or other changes or modifications made to resources in order to enhance or improve the operation of various functions within the private network. As the number and/or configuration of private network resources may become complex, it may be valuable to allow those entities with skill or expertise in the maintenance of those resources the capability to perform new deployments. However, allowing outside entities to make such deployments may risk exposure of those private operations and/or data which the private network maintains. Thus, private networks may implement various levels of network privacy or isolation in order to protect sensitive information. Yet, such protections may stymie the ability of outside entities to effectively make deployments to resources. For example, if an error occurs with respect to a deployment to a particular resource (e.g., a software update to certain type of database system), it may be difficult to obtain the information about the failure without violating the privacy restrictions enforced for the provider network.

Figure 1:
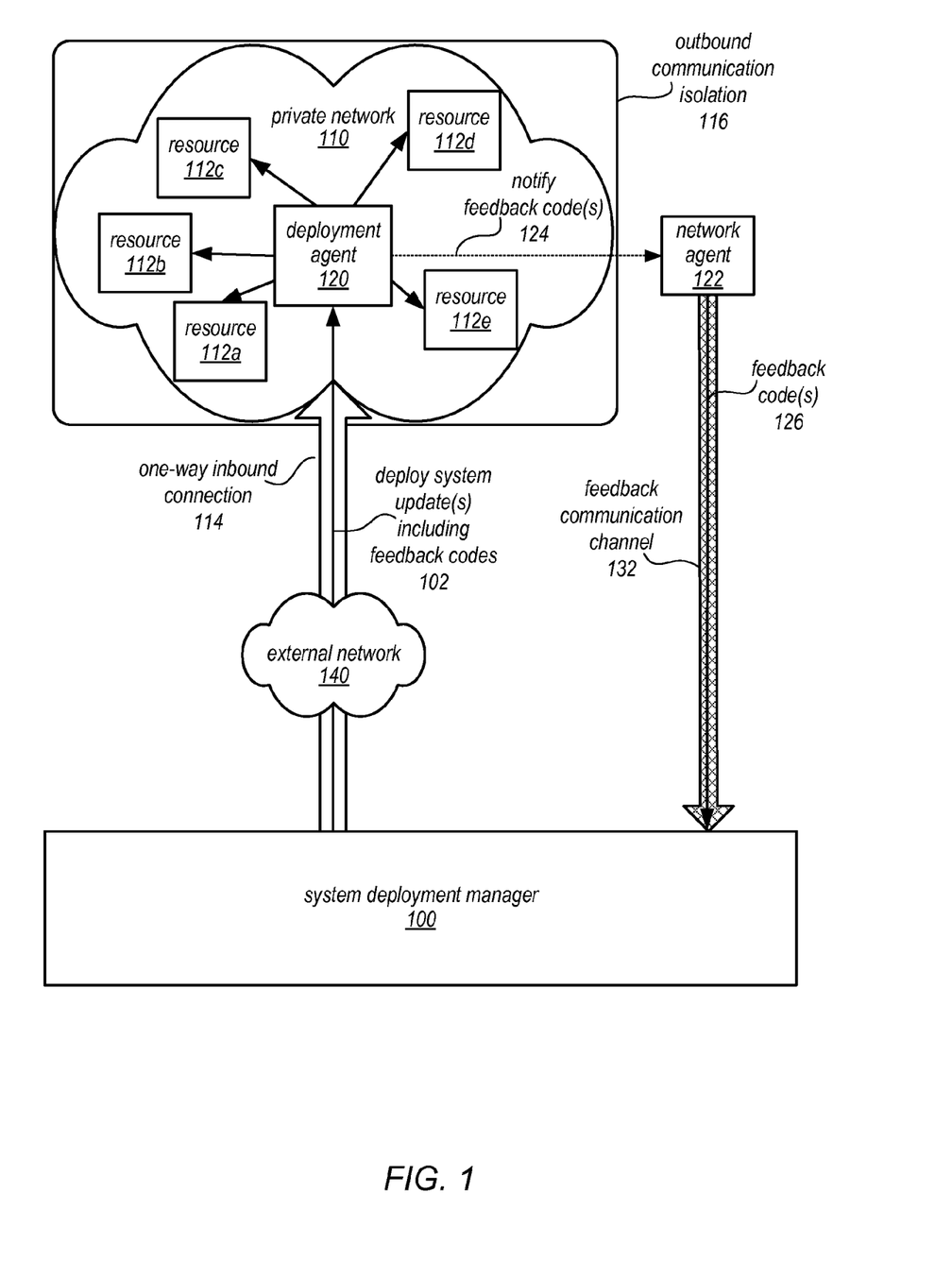
FIG. 1 is a logical data flow diagram illustrating deployment feedback for system updates to resources in private networks, according to some embodiments.

Deployment feedback may be provided in various embodiments in accordance with the level of privacy or isolation implemented for a provider network. A separate feedback communication channel may be implemented that allows deployment feedback to be communicated as a result of a deployment in a private network to an entity responsible for the performance of the deployment. FIG. 1 is a logical data flow diagram illustrating deployment feedback for system updates to a private network with outbound isolation, according to some embodiments. In various embodiments, a private network 110 may implement a variety of system resources 112 at one or more data centers, such as resources 112a, 112b, 112c, 112d, and 112e, to provide different systems, services, functions, and/or applications for clients internal to the private network 110. As illustrated in FIG. 1 private network 110 may be disconnected from outbound communication 100 in order to isolate private network 110 from external networks, such as external network 140. However, in at least some embodiments other levels of isolation or privacy may be implemented. For example, a private network close certain communication ports to publicly available networks, while maintaining open specific outbound connections that establish secure communications with particular networks, systems, resources, or devices. A bank, for instance, may implement a private network with a privacy level restricting the communication of certain kinds of financial information, except to other financial institutions with which the bank maintains a secure outbound communication link. Private network 110 may implement one-way inbound connection 114, which may allow traffic from an external network 140 (but via which no network traffic may leave the private network 110, or at least no traffic not allowed under the privacy/isolation level implemented for the private network). As noted above, as a resource configurations in private network 110 grow more complicated, it may be cost effective to rely upon an external provider of system updates, system deployment manager 100.

In various embodiments, system deployment manager 100 may be a system or service that provides various updates and changes to the resources 112 implemented in private network 110. System deployment manager 100 and private network 110 may be operated by different entities, in various embodiments, and thus system deployment manger 100 may still not be privy to the sensitive information of private network 110, and thus may perform updates to the resources 112 without violating outbound communication isolation 116 (or other privacy/isolation level implemented for private network 110). In some scenarios, debugging, troubleshooting, and other configuration operations with regard to the system deployments may be helpful and/or necessary to obtain more information about the performance of updates at private network 110.

In at least some embodiments, system deployment manager 110 may generate and include feedback code(s) when deploying system update(s) 102 to resource(s) 112 in private network 110. Deployment agent 120 may receive the deployment, and select appropriate feedback codes based on the performance of the system deployment. Deployment agent 120 may provide notification of the feedback codes 124 to a network agent 122 (e.g., an operator, user, or authorized individual for managing system deployments at private network 110). This notification may, in some embodiments, be provided through an input/output (I/O) interface that is local to private network 110. For example, in at least some embodiments, I/O interface is a graphical display. Network agent 122 may then provide the feedback code(s) 126 via a feedback communication channel 132 to system deployment manager 100 (or to an agent or support engineer thereof). The feedback communication channel may be isolated and disconnected from private network 110, such that no access to information of private network 110 may be obtained via feedback communication channel 132. In at least some embodiments, feedback communication channel may be a telephonic channel, or text-based messaging channel. Other communication channels, such as non-electronic forms of communication, may also be or alternatively be implemented for feedback communication channel 132 (e.g. agent to agent audible communication in a common location).

In some embodiments, private network 100 may provide multiple different network-based services for internal clients based on resource(s) 112. Private network 110 may be set up by an entity such as a company or a public sector organization to provide one or more network-based services (such as various types of cloud-based computing or storage) accessible to internal clients. Private network 110 may include numerous data centers hosting various resource pools, such as collections of physical and/or virtualized computer servers, storage devices, networking equipment and the like, needed to implement and distribute the infrastructure and services offered by the private network 110 to internal clients. Internal clients may be configured to access private network through private network connections direct to the private network 100.

Private network 110 may implement many different kinds of services, and thus the following discussion of various services is not intended to be limiting. For example, various network-based services may be implemented such as deployment service(s), management service(s), application service(s), and analytic service(s). In some embodiments, private network 110 may implement storage service(s). Storage service(s) may be one or more different types of services that provide different types of storage. For example, storage service(s) may be an object or key-value data store that provides highly durable storage for large amounts of data organized as data objects. In some embodiments, storage service(s) may include an archive long-term storage solution that is highly-durable, yet not easily accessible, in order to provide low-cost storage. In some embodiments, storage service(s) may provide virtual block storage for other computing devices, such as compute instances implemented as part of a virtual computing service. For example, a virtual block-based storage service may provide block level storage for storing one or more data volumes mapped to particular clients, providing virtual block-based storage (e.g., hard disk storage or other persistent storage) as a contiguous set of logical blocks. Storage service(s) may replicate stored data across multiple different locations, fault tolerant or availability zones, or nodes in order to provide redundancy for durability and availability for access.

In some embodiments, private network 110 may implement database service(s). Database services may include many different types of databases and/or database schemes. Relational and non-relational databases may be implemented to store data, as well as row-oriented or column-oriented databases. For example, a database service that stores data according to a data model in which each table maintained on behalf of a client contains one or more items, and each item includes a collection of attributes, such as a key value data store. In such a database, the attributes of an item may be a collection of name-value pairs, in any order, and each attribute in an item may have a name, a type, and a value. Some attributes may be single valued, such that the attribute name is mapped to a single value, while others may be multi-value, such that the attribute name is mapped to two or more values.

Private network 110 may implement networking service (s) in some embodiments. Networking service(s) may configure or provide virtual networks, such as virtual private networks (VPNs), among resources implemented in private network 110 as well as control access with other systems or devices in private network 100. For example, networking service(s) may be configured to implement security groups for compute instances in a virtual network. Security groups may enforce one or more network traffic policies for network traffic at members of the security group. Membership in a security group may not be related to physical location or implementation of a compute instance. The number of members or associations with a particular security group may vary and may be configured.

In some embodiments, private network 110 may implement virtual computing services, to provide computing resources. These computing resources may in some embodiments be offered to clients in units called "instances," such as virtual or physical compute instances or storage instances.

A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor) or machine image. A number of different types of computing devices may be used singly or in combination to implement compute instances, in different embodiments, including general purpose or special purpose computer servers, storage devices, network devices and the like. In some embodiments internal clients or other any other user may be configured (and/or authorized) to direct network traffic to a compute instance.

Please note that previous descriptions are not intended to be limiting, but are merely provided as a logical example of a private network, and system deployment manager. Various other components may interact with or assist in implementing a service platform specific language.

This specification next includes a general description of a system deployment manager, which may implement deployment feedback for updates to resources in a private network. Various examples of system deployment manager, as well as a deployment agent, are discussed, including different components/modules, or arrangements of components/module that may be employed as part of a resource tag service. A number of different methods and techniques to implement deployment feedback for updates to resources in a private network are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
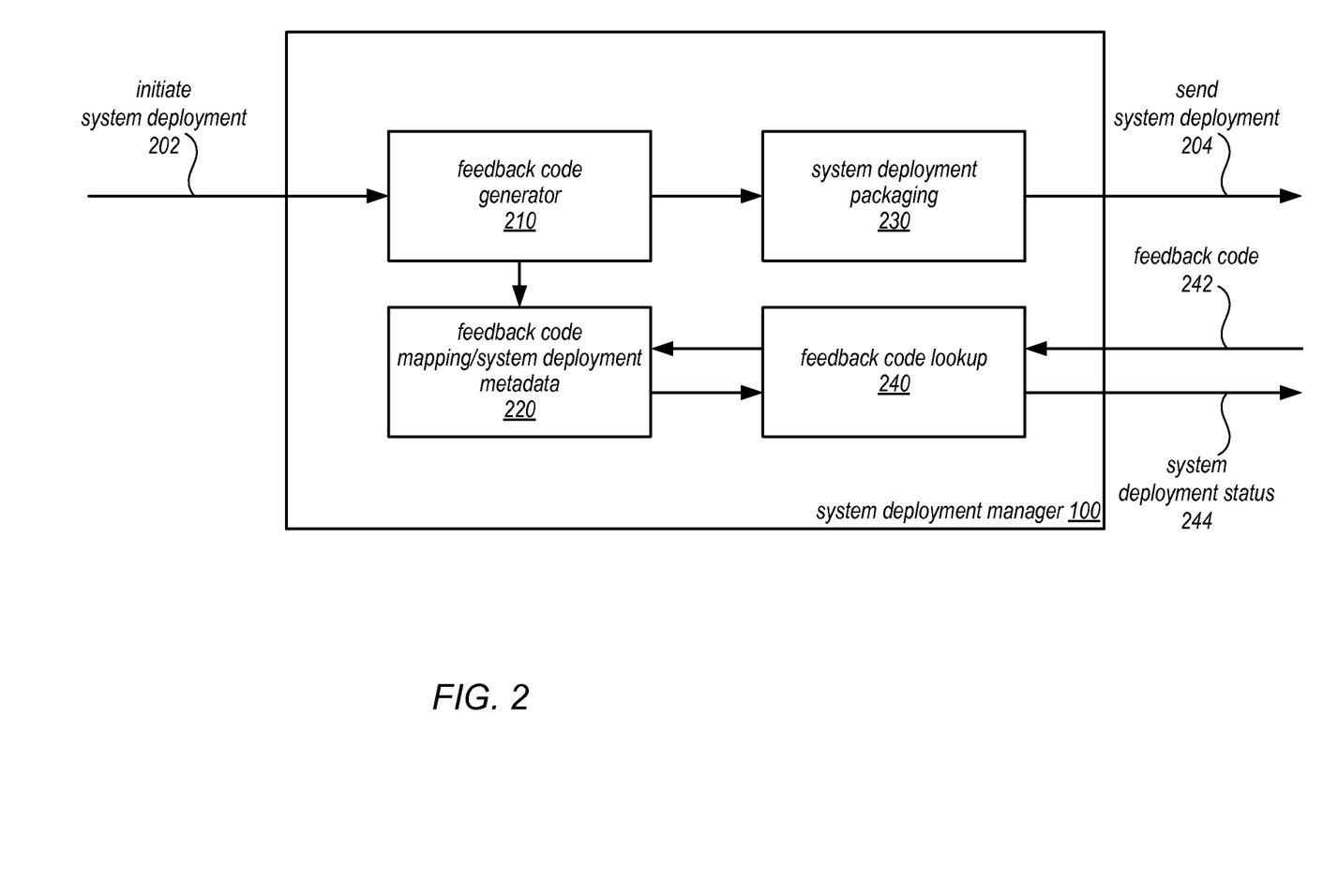
FIG. 2 is block diagram illustrating a system deployment manager, according to some embodiments.

FIG. 2 is block diagram illustrating a system deployment manager, according to some embodiments. System deployment manager 100 may be implemented in hardware and/or software on one or more systems, computers, or devices, such as computing system 1000 described below with regard to FIG. 7. System deployment manager may implement feedback code generator 210 to generate feedback codes for initiated system deployment(s) 202. For example feedback code generator may generate a short alphanumeric string (e.g. 6 characters) which may then be compared to a history of previously submitted feedback codes. If no matches are found, then the candidate feedback codes may be provided to system deployment packaging for inclusion 230 in when system deployments are sent 204 to a private network. As discussed below with regard to FIG. 4, generating feedback codes may include generating multiple feedback codes that correspond to different deployment statuses. For example, some deployments may include multiple updates, installations, or actions which may depend upon a previous update prior to performance. Such dependencies may be identified by feedback code generator 210 so that feedback codes may be generated which correspond to the progress of a deployment along the various updates included in a deployment. If a deployment fails, or is stopped prior to completing a particular update, then a feedback code may be generated that indicates those updates dependent upon the particular update as also failed/incomplete.

Figure 4:
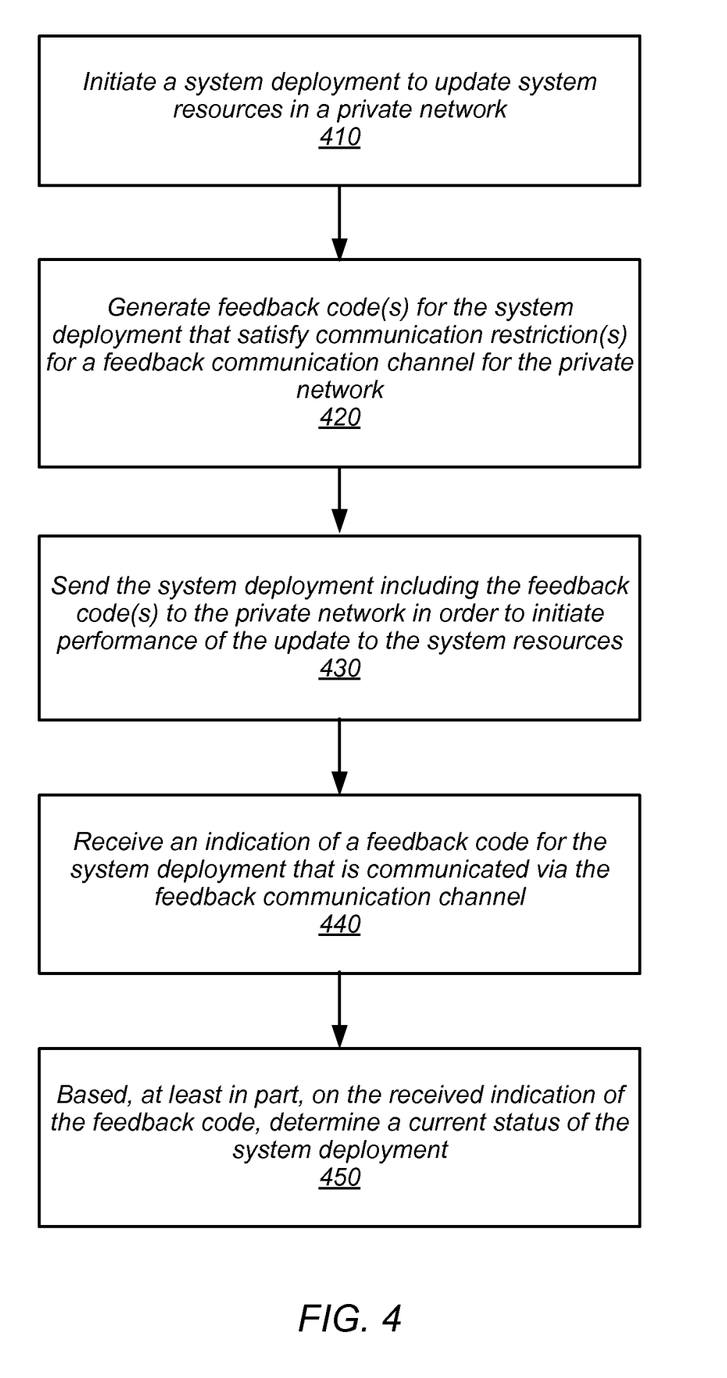
FIG. 4 is high-level flowchart illustrating various methods and techniques for implementing deployment feedback for system updates to resources in private networks, according to some embodiments.

In some embodiments, mapping information and system deployment metadata may be updated, in various embodiments, such as discussed below with regard to FIG. 4. Feedback code lookup 240 may be implemented to provide information related to a feedback code (e.g., a status for the system deployment 244) in response to submitted feedback codes 242. For example, a feedback code may be received via a feedback communication channel which an agent for system deployment manager 100 may use to generate a request to lookup the feedback code 242. A query, analysis, or other search of feedback code mapping/system deployment metadata 220 may be performed, such as discussed below with regard to FIG. 6, to retrieve a description of the deployment status (e.g., success, fail, partial success, etc.) from feedback code mapping/system deployment metadata 220.

Figure 3:
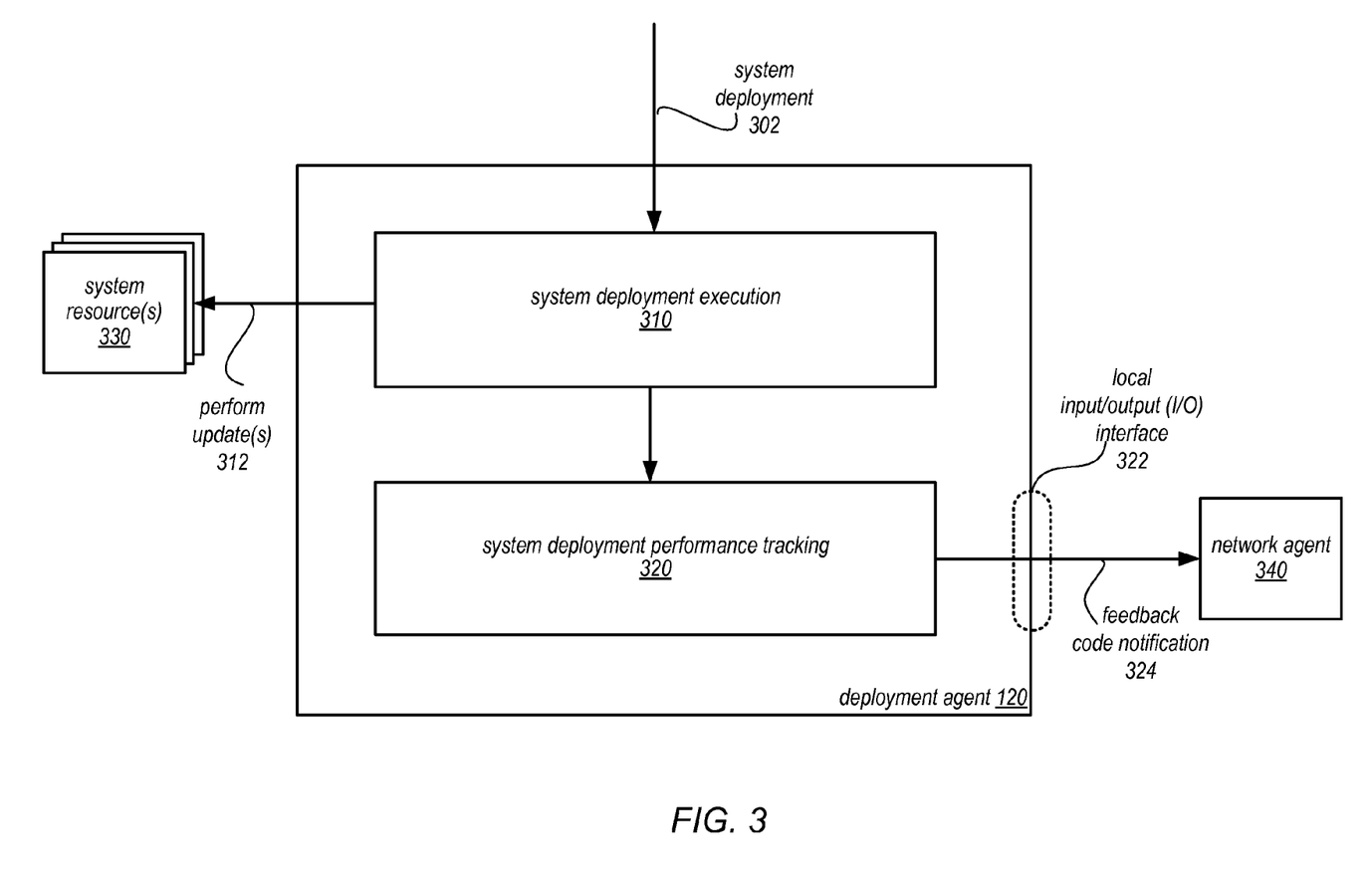
FIG. 3 is a block diagram illustrating a deployment agent implemented at a private network, according to some embodiments.

FIG. 3 is a block diagram illustrating a deployment agent implemented at a private network, according to some embodiments. Deployment agent 120 may be implemented in hardware and/or software on one or more systems, computers, or devices, such as computing system 1000 described below with regard to FIG. 7. System deployment execution 310 may be implemented to perform the updates 312 to respective system resources 330 identified in the system deployment 302 received at deployment agent 120. For example, system deployment execution 310 may unzip, unpack, execute, trigger, call, or otherwise initiate various automated deployment actions to perform update(s) 312. In some embodiments, system deployment execution 310 may request confirmation and/or authorization from an authorized operator or user. In some embodiments, system deployment execution 310 may accept manual commands or requests to perform the system deployment (not illustrated).

As illustrated in FIG. 3, system deployment agent 120 may implement system deployment performance tracking 320 to collect various information about the performance of update(s) 312. For example logs and/or other tracking mechanisms may retain information describing the changes made to resources, the amount of time, errors encountered or triggered, and/or any other performance characteristics. Based on the performance of the update, system deployment performance tracking 320 may select feedback code(s) included with the system deployment as received at the private network may be selected (as discussed below with regard to FIG. 5). Notification of the feedback code(s) 324 may be provided via local input/output (I/O interface) 322 to network agent 340 (e.g., an operator, agent, or other authorized individual that handles system deployments). For example, an I/O interface 322 may be a graphical display, and the notification on such a graphical display may be a posting to a web page internal to the provider network. Various other user interfaces may be provided. In some embodiments, a message or notification may be sent to an internal account (e.g., a message queue, a local electronic mail address). Selected feedback codes may be printed or physical posted to physical medium, or they may be communicated audibly for an operator to hear (and possibly copy down).

The system deployment mangers and deployment agents that implement deployment feedback for system updates to outbound isolated private networks, as discussed above with regard to FIGS. 1-3 have been given as examples. Various other types or configurations of system deployment mangers and deployment agents, and other components may implement these techniques. Thus, FIG. 4 is high-level flowchart illustrating various methods and techniques for implementing deployment feedback for system updates to outbound isolated private networks, according to some embodiments.

As indicated at 410, a system deployment to update system resources in a private network may be initiated. As discussed above, a private network may have varying levels of privacy or isolation. From complete outbound isolation, to limited outbound channels, data types, recipients, or other isolation/privacy limitations, a private network may rely upon communication of feedback codes via a feedback communication in at least some embodiments. The update of the system deployment may be utilized to perform various operations at system resources implemented at the private network, such as rebuilding machines, servers, or other systems, downloading new machine images, reconfiguring system BIOS, configuring network devices, modifying or changing operating systems or other application software, and/or any other change to the system resources.

As indicated at 420, feedback code(s) may be generated for the system deployment that satisfy communication restriction(s) for a feedback communication channel for the private network that is isolated and disconnected from the private network, in various embodiments. As noted earlier, the feedback communication channel may be implemented in such a way as to provide no direct connection to or interaction with the private network. The feedback communication channel may be located in the same physical location (e.g., within the same building or physical data center), but may utilize different physical communication infrastructure (e.g., separate, dedicated phone lines or network connections). In some embodiments, the feedback communication channel may be located/operated in a different physical location than the private network.

The communication restrictions of the feedback communication channel may be infrastructure related, isolation related, and/or operator related. Infrastructure communication restrictions may limit the bandwidth of the feedback communication channel. For example, a messaging communication channel may be limited to information that may be manually entered (e.g., an internet relay chat (IRC) channel or the like). Isolation related restrictions may limit the amount of data or information that may be communicated at a time in order to preserve outbound isolation of data maintained in the private network. For example, text communication may be limited to a certain number of characters (e.g., 10 character strings), so that large portions of information may not be manually transferred via the feedback communication channel. Operator communication restrictions may practically limit the amount of data. For example, a telephonic feedback communication channel may limit the amount of data passed, requiring it be transmitted audibly. Moreover, the operator related restrictions may also impose limits on length or complicated text combinations (e.g., avoiding the introduction of operator error in relaying the feedback code). Thus, in various embodiments, the feedback codes may be generated such that the communication restrictions are satisfied. For example, a short alphanumeric string may be utilized as the feedback code in some embodiments (e.g., a 6 character string).

Multiple feedback codes may be generated in some embodiments, to provide greater feedback, increasing the amount of information that may be conveyed by the feedback code. For example, in some embodiments, a standard set of feedback codes corresponding to a set of deployment statuses may be generated for each system deployment (e.g., successful, failure, partial success, etc. . . . ). In at least some embodiments, the system deployment may be evaluated to determine or identify various statuses specific to the update being performed. For example, statuses may be identified that corresponding to the success or failure of updates to specific resources, operations, error codes, interrupts, flags, states, or any other descriptive or useful information for determining the particular status of the system deployment. Identified status may create a very large number of feedback codes, in some embodiments. For instance, feedback codes may be generated for each possible failure/status combination in a deployment (which may affect multiple resources). In some embodiments, the number of feedback codes may be limited based on size (e.g., storage space for the feedback codes) or cost to identify (e.g., certain amount of computation time for identifying feedback codes). In some embodiments, the relationships between various actions, updates, or operations of a deployment may be analyzed to determine dependencies, hierarchies, or other status scenarios that may be described using a feedback code. Once identified, corresponding feedback codes may be generated for each identified status.

As part of generating feedback codes, mapping information maintaining links between feedback codes and system deployments (as well as their respective metadata) may be maintained. For instance, a database table, storage object or structure, list, index or other collection of active or submitted feedback codes may have new entries added for each generated feedback code. The mapping information may identify a permanent identifier for the system deployment that includes the feedback, such as globally unique identifier. The system deployment identifier may then be used to access a set of metadata describing the system deployment, which may be used to translate or determine statuses (as well as other information) based on the feedback codes generated for the system deployment.

In at least some embodiments, a history of previously submitted feedback codes may be maintained. The history of feedback codes may be evaluated when generating feedback codes to prevent the use of duplicate codes. For example, candidate codes may be generated and then compared to the history of feedback codes. If no matching feedback codes are found, then the candidate feedback codes may become the feedback codes to be included in the system deployment.

Figure 5:
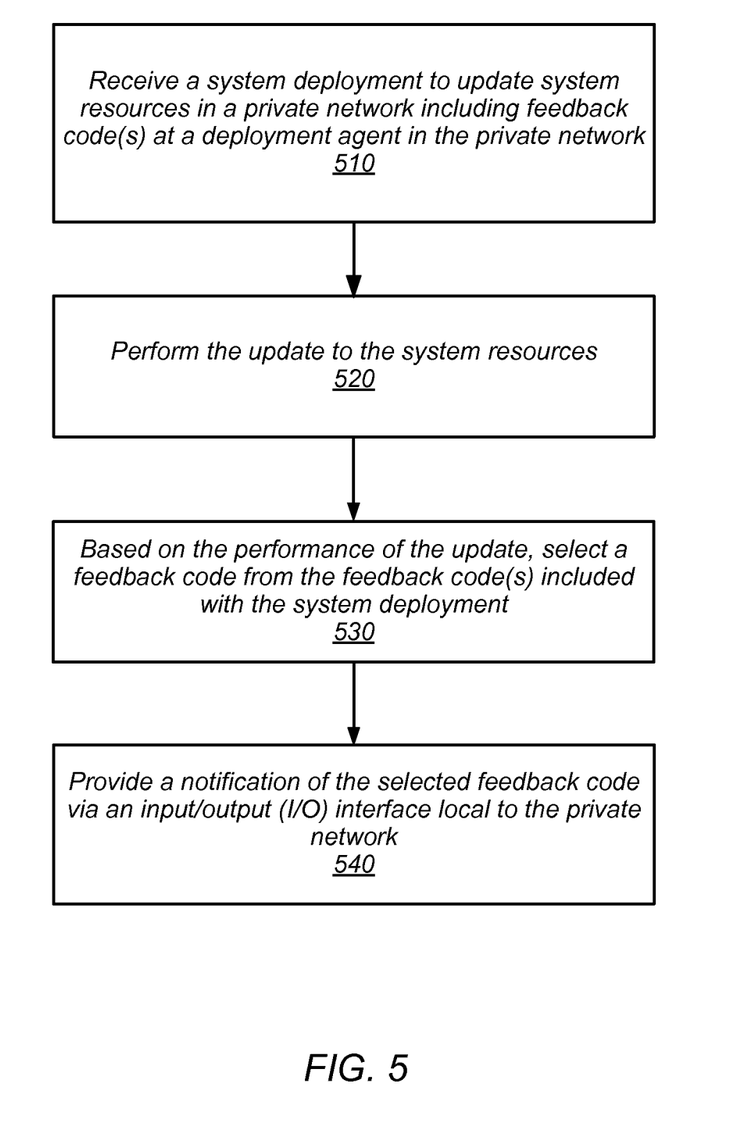
FIG. 5 is high-level flowchart illustrating various methods and techniques for performing system deployments and providing notifications of feedback codes, according to some embodiments.

As indicated at 430, the system deployment may be sent to the private network including the feedback code(s) in order to initiate the performance of the update to the system resources, in various embodiments. A one-way inbound connection may be utilized, in some embodiments, to send the deployment including feedback code(s) from a deployment manager via an external network to a private network. FIG. 5, discussed below provides various examples of deploying updates at the private network. At some time, an indication of a feedback code may be received, as indicated at 440. The indication of the feedback code may come from a message, communication, directly via the feedback communication channel, or may be provided by an intermediary system or operator (e.g., a support engineer manually entering the feedback code provided over a telephonic channel), in various embodiments.

Based, at least in part, on the received indication of the feedback code, a current status of the system deployment may be determined, in various embodiments, as indicated at 450. For instance, the mapping information for the feedback code may be accessed (as discussed below with regard to FIG. 6), which may lead to system deployment metadata which translates or provides information that describes the current status of the system deployment. In at least some embodiments, further responsive actions may be performed based on the status. For example, a feedback code that is determined to indicate a deployment success status, may trigger the update of various metadata or other state information that is used to track updates applied to the private network, in some embodiments. In another example, a feedback code that is determined to indicate a complete or particular failure scenario, may be utilized to access metadata describing the system deployment in order to identify the specific failure (which may be useful for debugging).

Deployment agents, or other systems, components, or devices, that deploy updates to resources at a provider network may be configured to provide notification of feedback codes to agents, operators, or others participating in the deployment of the updates. As discussed above (and below), these feedback codes provide a rich set of information as to the performance of system deployments without violating the outbound isolation properties of the private network. FIG. 5 is high-level flowchart illustrating various methods and techniques for performing system deployments and providing notifications of feedback codes, according to some embodiments.

As indicated at 510, a system deployment to update system resources may be received at a deployment agent implemented at a provider network that includes feedback codes(s), in various embodiments. The system deployment may be formatted as package, executable, or other software container or format that allows the deployment agent to facilitate the performance of the update to the system resources, as indicated at 520. Performance of the updates may be manually performed (or manually approved), in some embodiments. While in other embodiments, the performance of the update to the system resources may be performed automatically, (although in some scenarios manual approval may be required before performing the automated update).

As some system deployments may involve performing updates to many different resources, in various different ordering, settings, and/or conditions, the possibility of failure or partial completion may be great. Logs and/or other tracking mechanisms may retain information describing the changes made to resources, the amount of time, errors encountered or triggered, and/or any other performance characteristics. However maintained or determined, based on the performance of the update, a feedback code of the feedback code(s) including with the system deployment as received at the private network may be selected, as indicated at 530. In at least some embodiments, various criteria, policies, or rules may be included with the feedback codes which are evaluated based on the performance of the update. If, the performance satisfies a rule for a feedback code, then the feedback code may be selected. Please note that in some embodiments, multiple feedback codes may be selected. For example, if various flags, interrupts, or completion messages are detected or logged during the performance of the update, then multiple feedback codes which have rules satisfied by these flags, interrupts, or completions messages may be selected.

In various embodiments, notification of the selected feedback code (or codes) may be provided via an I/O interface local to the private network, as indicated at 540. For example, an I/O interface may be a graphical display, and the notification on such a graphical display may be a posting to a web page internal to the provider network. Various other graphical user interfaces may be provided. In some embodiments, a message or notification may be sent to an internal account (e.g., a message queue, a local electronic mail address). Selected feedback codes may be printed or physical posted to physical medium, or they may be communicated audibly for an operator to hear (and possibly copy down).

Once notified, as discussed above with regard to FIG. 4, the agents, operators, or other individual may proceed to utilize the feedback communication channel for the provider network, in some embodiments. For example, a dedicated terminal implementing an isolated communication link to the system deployment manger may be provided, which allows the operator to type or otherwise enter feedback codes. In some embodiments, the operator may leave the physical location implementing the provider network to reach a different location to utilize the feedback communication channel. In at least some embodiments, the feedback communication may be telephonic, allow the operator to provide the feedback code to an agent, operator, and/or support engineer for the deployment system manager over a telephone conversation.

Figure 6:
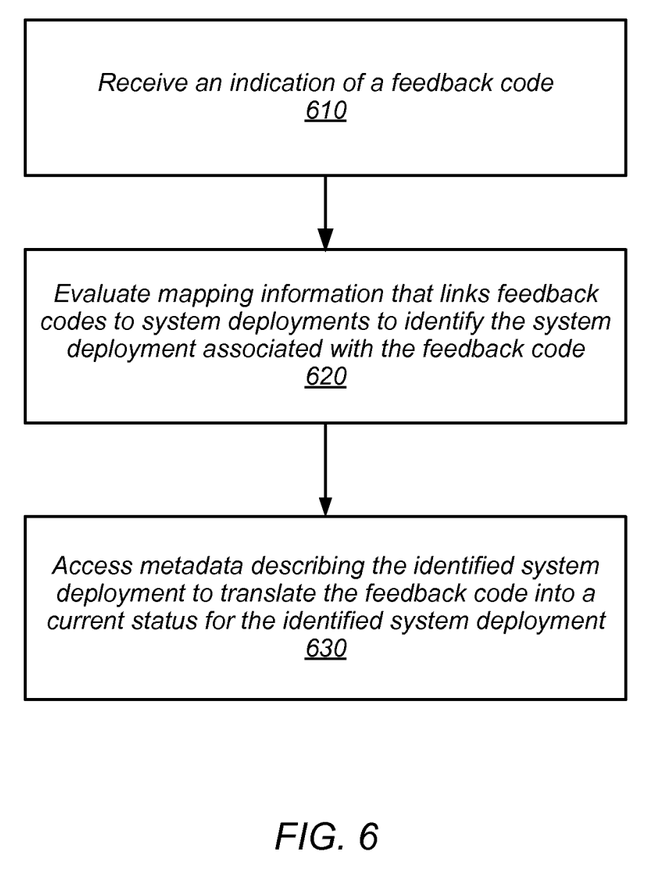
FIG. 6 is high-level flowchart illustrating various methods and techniques for implementing identifying metadata describing a system deployment based on a feedback code, according to some embodiments.

FIG. 6 is high-level flowchart illustrating various methods and techniques for implementing identifying metadata describing a system deployment based on a feedback code, according to some embodiments. As noted earlier feedback codes may be implemented to communicate a rich set of information regarding the performance of a system deployment without transmitting the rich set of information between the private network and the deployment system. As the feedback codes may themselves be generated to satisfy certain communication restrictions for the feedback channel (e.g., as to data bandwidth, content filtering, or practical/human communication limits), the feedback codes may instead locate or point to the set of information to be communicated about the system deployment at the private network.

When generating one or more feedback codes for a system deployment, mapping information may be updated to link the feedback codes to metadata describing the update (as discussed above with regard to FIG. 4). Thus, as indicated at 610, when an indication of a feedback code is received, the mapping information that links feedback codes to system deployments may be evaluated to identify the system deployment associated with the feedback. For instance, an index of live feedback codes for the mapping information may be maintained so that when the indication of the feedback code is receive, the index may be efficiently searched to identify the mapping information for the feedback code. The mapping information may then provide an identifier for the system deployment, which may not be subject to the same communication restrictions as the feedback codes. For example, a permanent globally unique identifier may be assigned to the system deployment such that the probability of collision is effectively zero.

The identifier for the system deployment in the mapping information, or other technique for identifying the system may be utilized to access metadata describing the identified system deployment to translate the feedback code into a current status for the identified system deployment, as indicated at 630. For example, as noted above, multiple different feedback codes may be included in a system deployment, each of which may correspond to a different status. For example, various failure or completion scenarios may correspond to the different feedback codes for a system deployment. The metadata may provide the corresponding status (as well as the various information indicated by that status) for each of the different feedback codes.

When multiple system deployments are currently being performed, this technique of identifying a particular system deployment based on a feedback code may allow a system deployment manager, or other system or component implementing this technique to provide relevant information as maintained in metadata for a specific system deployment. For example, if an operator or technician at the private network is attempting to troubleshoot or debug a system deployment failure at the private network, providing the feedback code to a support engineer for the system deployment manager may allow the support engineer to identify specific debugging strategies, operations, or techniques to correct the problem (e.g., the information may indicate which package, patch, code, resource, etc. failed to update, thus localizing the problem for further debugging). In at least some embodiments, access controls restricting the ability of feedback codes received via a feedback communication channel may be enforced. For example, an agent of a system deployment manager may have to enter certain access credential before receiving back the meaning of a feedback code.

The methods described herein may in various embodiments be implemented by any combination of hardware and software. For example, in one embodiment, the methods may be implemented by a computer system (e.g., a computer system as in FIG. 7) that includes one or more processors executing program instructions stored on a computer-readable storage medium coupled to the processors. The program instructions may be configured to implement the functionality described herein (e.g., the functionality of various servers and other components that implement the client and/or provider network described herein). The various methods as illustrated in the figures and described herein represent example embodiments of methods. The order of any method may be changed, and various elements may be added, reordered, combined, omitted, modified, etc.

Figure 7:
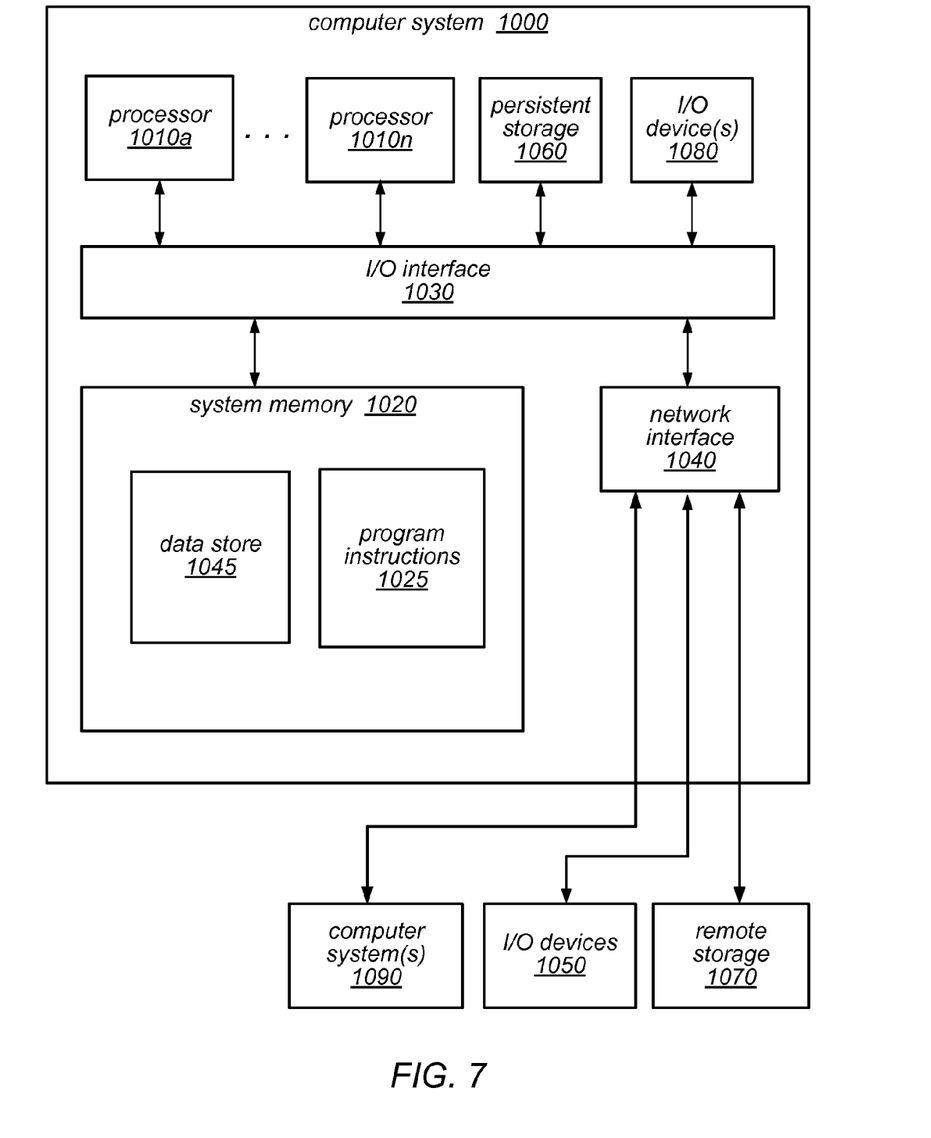
FIG. 7 is a block diagram illustrating an example computing system, according to some embodiments.

Embodiments of implementing deployment feedback for system updates to resources in private networks, as described herein, may be executed on one or more computer systems, which may interact with various other devices. FIG. 7 is a block diagram illustrating an example computer system, according to various embodiments. For example, computer system 1000 may be configured to implement nodes of a provider network, network-based service, a data store, and/or a client, in different embodiments. Computer system 1000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 1000 includes one or more processors 1010 (any of which may include multiple cores, which may be single or multi-threaded) coupled to a system memory 1020 via an input/output (I/O) interface 1030. Computer system 1000 further includes a network interface 1040 coupled to I/O interface 1030. In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA. The computer system 1000 also includes one or more network communication devices (e.g., network interface 1040) for communicating with other systems and/or components over a communications network (e.g. Internet, LAN, etc.). For example, a client application executing on system 1000 may use network interface 1040 to communicate with a server application executing on a single server or on a cluster of servers that implement one or more of the components of the system described herein. In another example, an instance of a server application executing on computer system 1000 may use network interface 1040 to communicate with other instances of the server application (e.g., a deployment manager communicating to a deployment agent) that may be implemented on other computer systems (e.g., computer systems 1090).

In the illustrated embodiment, computer system 1000 also includes one or more persistent storage devices 1060 and/or one or more I/O devices 1080. In various embodiments, persistent storage devices 1060 may correspond to disk drives, tape drives, solid state memory, other mass storage devices, or any other persistent storage device. Computer system 1000 (or a distributed application or operating system operating thereon) may store instructions and/or data in persistent storage devices 1060, as desired, and may retrieve the stored instruction and/or data as needed. For example, in some embodiments, computer system 1000 may host a storage node, and persistent storage 1060 may include the SSDs attached to that server node.

Computer system 1000 includes one or more system memories 1020 that are configured to store instructions and data accessible by processor(s) 1010. In various embodiments, system memories 1020 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 1020 may contain program instructions 1025 that are executable by processor(s) 1010 to implement the methods and techniques described herein. In various embodiments, program instructions 1025 may be encoded in platform native binary, any interpreted language such as Java™ byte-code, or in any other language such as C/C++, Java™, etc., or in any combination thereof. For example, in the illustrated embodiment, program instructions 1025 include program instructions executable to implement the functionality of a deployment system manager or deployment system agent, in different embodiments. In some embodiments, program instructions 1025 may implement multiple separate clients, server nodes, and/or other components.

In some embodiments, program instructions 1025 may include instructions executable to implement an operating system (not shown), which may be any of various operating systems, such as UNIX, LINUX, Solaris™, MacOS™, Windows™, etc. Any or all of program instructions 1025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 1000 via I/O interface 1030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 1000 as system memory 1020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1040.

In some embodiments, system memory 1020 may include data store 1045, which may be configured as described herein. In general, system memory 1020 (e.g., data store 1045 within system memory 1020), persistent storage 1060, and/or remote storage 1070 may store data blocks, replicas of data blocks, metadata associated with data blocks and/or their state, configuration information, and/or any other information usable in implementing the methods and techniques described herein.

In one embodiment, I/O interface 1030 may be configured to coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems 1090 (which may implement one or more storage system server nodes, database engine head nodes, and/or clients of the database systems described herein), for example. In addition, network interface 1040 may be configured to allow communication between computer system 1000 and various I/O devices 1050 and/or remote storage 1070. Input/output devices 1050 may, in some embodiments, include one or more display terminals, keyboards, keypads, touchpads, scanning devices, voice or optical recognition devices, or any other devices suitable for entering or retrieving data by one or more computer systems 1000. Multiple input/output devices 1050 may be present in computer system 1000 or may be distributed on various nodes of a distributed system that includes computer system 1000. In some embodiments, similar input/output devices may be separate from computer system 1000 and may interact with one or more nodes of a distributed system that includes computer system 1000 through a wired or wireless connection, such as over network interface 1040. Network interface 1040 may commonly support one or more wireless networking protocols (e.g., Wi-Fi/IEEE 802.11, or another wireless networking standard). However, in various embodiments, network interface 1040 may support communication via any suitable wired or wireless general data networks, such as other types of Ethernet networks, for example. Additionally, network interface 1040 may support communication via telecommunications/telephony networks such as analog voice networks or digital fiber communications networks, via storage area networks such as Fibre Channel SANs, or via any other suitable type of network and/or protocol. In various embodiments, computer system 1000 may include more, fewer, or different components than those illustrated in FIG. 7 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a compute cluster within a computing service may present computing services and/or other types of services that employ the distributed computing systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system, comprising:
    a plurality of compute nodes respectively comprising at least one processor and a memory that together implement a system deployment manager that performs one or more system updates to system resources implemented at a private network, wherein the private network is disconnected from outbound communication in order to isolate the private network from external networks;
    the system deployment manager, configured to:
        for a given system deployment to update one or more system resources implemented at the private network:

generate one or more feedback codes for the given system deployment, wherein the one or more feedback codes are generated to satisfy one or more communication restrictions for a feedback communication channel for the private network, wherein the feedback communication channel is isolated and disconnected from the private network;

send the system deployment including the one or more feedback codes via a one-way inbound connection through an external network from the system deployment manager to the private network in order to initiate performance of the update to the one or more system resources implemented at the private network;

receive an indication of at least one of the feedback codes for the given system deployment, wherein the at least one feedback code is communicated via the feedback communication channel for the private network; and based, at least in part, on the received indication of the at least one feedback code, determine a current status of the system deployment.

2. The system of claim 1, wherein to generate the one or more feedback codes for the given system deployment, the system deployment manager is configured to update mapping information to link the one or more feedback codes to metadata describing the given system deployment; and wherein to determine the current status of the system deployment, the deployment system manager is configured to access the metadata describing the given system deployment.

3. The system of claim 1, wherein to generate the one or more feedback codes for the given system deployment, the system deployment manager is configured to:

based, at least in part, on the update to the one or more resources performed as part of the system deployment, identify a plurality of different potential system deployment statuses as a result of the performance of the update; and generate a corresponding feedback code to indicate each of the identified potential system statuses to be included with the system deployment.

4. The system of claim 1, wherein to generate the one or more feedback codes for the given system deployment, the system deployment manager is configured to update mapping information to link the one or more feedback codes to metadata describing the given system deployment; and wherein the generation and the send are performed for multiple system deployments; and wherein to determine the current status of the given system deployment, the deployment system manager is configured to:

evaluate the mapping information to identify the given system deployment; and access the metadata describing the given system deployment to translate the at least one feedback code of the given system deployment into the current status for the given system deployment.

5. A method, comprising:

performing, by one or more computing devices:

for a given system deployment to update one or more system resources implemented at a private network:

generating one or more feedback codes for the given system deployment, wherein the one or more feedback codes are generated to satisfy one or more communication restrictions for a feedback communication channel for the private network, wherein the feedback communication channel is isolated and disconnected from the private network;

sending the system deployment including the one or more feedback codes through an external network to the private network in order to initiate performance of the update to the one or more system resources implemented at the private network;

receiving an indication of at least one of the feedback codes for the given system deployment, wherein the at least one feedback code is communicated via the feedback communication channel for the private network; and based, at least in part, on the received indication of the at least one feedback code, determining a current status of the system deployment.

6. The method of claim 5, wherein generating one or more feedback codes for the given system deployment comprises:

generating one or more candidate feedback codes;

evaluating a history of previously sent feedback codes to determine that the one or more feedback codes are not duplicates such that the one or more candidate feedback codes are included with the given system deployment as the one or more feedback codes.

7. The method of claim 5, wherein generating one or more feedback codes for the given system deployment comprises:

wherein generating the one or more feedback codes for the given system deployment, comprises updating mapping information to link the one or more feedback codes to metadata describing the given system deployment; and wherein determining the current status of the system deployment, comprises accessing the metadata describing the given system deployment.

8. The method of claim 5, wherein generating the one or more feedback codes for the given system deployment, comprises:

based, at least in part, on the update to the one or more resources performed as part of the system deployment, identifying a plurality of different potential system deployment statuses as a result of the performance of the update; and generating a corresponding feedback code to indicate each of the identified potential system statuses to be included with the system deployment.

9. The method of claim 5, wherein the one or more computing devices implement a system deployment manager, and wherein the method further comprises:

performing, by at least one computing device implementing a deployment agent located in the private network:

receiving the system deployment;

performing the update to the one or more system resources implemented at the private network;

based on the performance of the update, selecting a feedback code from the one or more feedback codes included with the system deployment; and providing a notification of the selected feedback via a input/output (I/O) interface local to the private network.

10. The method of claim 9, wherein the I/O interface local to the private network is a graphical display.

11. The method of claim 5, wherein the private network implements a network-based platform offering a plurality of different network-based services, wherein the one or more system resources are one or more network-based resources implemented as part of the one or more of the different network-based services.

12. The method of claim 5, wherein the at least one feedback code indicates that the given system deployment successfully updated the one or more system resources implemented at the private network, and wherein the method further comprises:
updating metadata describing the one or more system resources to include the update to describe a new current version of the one or more system resources.

13. The method of claim 5,
wherein generating the one or more feedback codes for the given system deployment, comprises updating mapping information to link the one or more feedback codes to metadata describing the given system deployment; and
wherein the generating and the sending are performed for multiple system deployments; and
wherein determining the current status of the given system deployment, comprises:
evaluating the mapping information to identify the given system deployment; and
accessing the metadata describing the given system deployment to translate the at least one feedback code of the given system deployment into the current status for the given system deployment.

14. A non-transitory, computer-readable storage medium, storing program instructions that when executed by one or more computing devices cause the one or more computing devices to implement:
for a given system deployment to update one or more system resources implemented at a private network:
generating one or more feedback codes for the given system deployment, wherein the one or more feedback codes are generated to satisfy one or more communication restrictions for a feedback communication channel for the private network, wherein the feedback communication channel is isolated and disconnected from the private network;
sending the system deployment including the one or more feedback codes through an external network to the private network in order to initiate performance of the update to the one or more system resources implemented at the private network;
receiving an indication of at least one of the feedback codes for the given system deployment, wherein the at least one feedback code is communicated via the feedback communication channel for the private network; and
based, at least in part, on the received indication of the at least one feedback code, determining a current status of the system deployment.

15. The non-transitory, computer-readable storage medium of claim 14, wherein, in generating the one or more feedback codes for the given system deployment, the program instructions cause the one or more computing devices to implement:
based, at least in part, on the update to the one or more resources performed as part of the system deployment, identifying a plurality of different potential system deployment statuses as a result of the performance of the update; and
generating a corresponding feedback code to indicate each of the identified potential system statuses to be included with the system deployment.

16. The non-transitory, computer-readable storage medium of claim 14,
wherein, in generating one or more feedback codes for the given system deployment, the program instructions cause the one or more computing devices to implement:
generating one or more candidate feedback codes;
evaluating a history of previously sent feedback codes to determine that the one or more feedback codes are not duplicates such that the one or more candidate feedback codes are included with the given system deployment as the one or more feedback codes;
updating mapping information to link the one or more candidate feedback codes to metadata describing the given system deployment; and
wherein, in determining the current status of the system deployment, the program instructions cause the one or more computing devices to implement accessing the metadata describing the given system deployment.

17. The non-transitory, computer-readable storage medium of claim 14, wherein the feedback communication channel for the private network is a telephonic communication channel.

18. The non-transitory, computer-readable storage medium of claim 14, wherein the generating the one or more feedback codes, the sending of the system deployment, the receiving of the at least one feedback code, and the determining of the system deployment current status are performed by a system deployment manager, wherein the program instructions cause the one or more computing devices to further implement:
receiving the system deployment at a deployment agent implemented at the private network;
performing, by the deployment agent, the update to the one or more system resources implemented at the private network;
based on the performance of the update, selecting, by the deployment agent, a feedback code from the one or more feedback codes included with the system deployment; and
providing, by the deployment agent, a notification of the selected feedback via a input/output (I/O) interface local to the private network.

19. The non-transitory, computer-readable storage medium of claim 14,
wherein, in generating the one or more feedback codes for the given system deployment, the program instructions cause the one or more computing devices to implement updating mapping information to link the one or more feedback codes to metadata describing the given system deployment; and
wherein the generating and the sending are performed for multiple system deployments; and
wherein, in determining the current status of the given system deployment, the program instructions cause the one or more computing devices to implement:
evaluating the mapping information to identify the given system deployment; and
accessing the metadata describing the given system deployment to translate the at least one feedback code of the given system deployment into the current status for the given system deployment.

20. The non-transitory, computer-readable storage medium of claim 14, wherein the at least one feedback code indicates that the given system deployment failed to update the one or more system resources implemented at the private network, and wherein the program instructions further cause the one or more computing devices to implement:

accessing metadata describing the system deployment to identify one or more specific failures for the system deployment; and providing a notification of the specific failures.

\* \* \* \* \*